United States Patent [19]

Shanbhag et al.

[11] Patent Number: 5,000,970
[45] Date of Patent: * Mar. 19, 1991

[54] PROCESS FOR PREPARING REHEATABLE FRENCH FRIED POTATOES

[75] Inventors: Sudhakar P. Shanbhag, Pound Ridge, N.Y.; Joseph J. Cousminer, Mercerville, N.J.

[73] Assignee: Horizons International Foods, Inc., Burlington, Mass.

[ * ] Notice: The portion of the term of this patent subsequent to Jun. 5, 2007 has been disclaimed.

[21] Appl. No.: 374,325

[22] Filed: Jun. 30, 1989

[51] Int. Cl.$^5$ .............................................. A23L 1/217
[52] U.S. Cl. .................................. 426/296; 426/438; 426/441; 426/524; 426/637
[58] Field of Search ............... 426/438, 441, 637, 524, 426/296; 62/62, 63, 64

[56] References Cited

U.S. PATENT DOCUMENTS

| | | | |
|---|---|---|---|
| 3,404,989 | 10/1968 | Hirtensteiner | 426/524 X |
| 4,272,553 | 6/1981 | Bengtsson et al. | 426/296 X |
| 4,579,743 | 4/1986 | Hullah | 426/637 X |
| 4,590,080 | 5/1986 | Pinegar | 426/441 |
| 4,632,838 | 12/1986 | DeEnges | 426/441 |

FOREIGN PATENT DOCUMENTS 2018081  1/1982  United Kingdom ............... 426/438

Primary Examiner—Arthur L. Corbin
Attorney, Agent, or Firm—Kenyon & Kenyon

[57] ABSTRACT

A process for producing fully cooked french fried potatoes which, when reheated to a suitable consumption temperature, closely simulate the color, texture, aroma, flavor, mouthfeel and total eating experience of state of the art french fries prepared for serving in fast food restaurants, i.e., by deep fat frying. The process includes parfrying potato strips, cooling or freezing the parfried potato strips, dust coating with potato granules and thereafter finish frying the potato strips to a fully cooked, ready-to-eat condition. The potato strips are then gently frozen without any substantial desiccation. For consumption, the frozen finish fried potato strips are reheated to a suitable temperature for consumption via the use of a conventional or convection oven, heat lamp, or the like.

41 Claims, 10 Drawing Sheets

PROCESS FOR PREPARING REHEATABLE FRENCH FRIED POTATOES

FIELD OF THE INVENTION

The present invention relates to a process for producing a fully cooked french fried potato product which upon reheating to a suitable temperature for consumption closely resembles the size, shape, appearance, color, texture, taste, aroma, and total eating experience of french fried potato products which have been deep fat fried immediately prior to eating.

BACKGROUND OF THE INVENTION

The market for french fried potato strips, commonly referred to as french fries, is currently estimated at approximately 6.5–7 billion dollars annually. The bulk of this market is the fast-food restaurant business, wherein parfried and frozen potato strips are commonly purchased in bulk from commercial suppliers and stored at freezer temperatures until shortly before serving. At that point, the parfried and frozen potato strips are prepared for eating by deep fat frying in fat or oil.

McDonald's TM french fries, long considered the state-of the art in the fast-food industry, apparently are processed according to the process disclosed in U.S. Pat. No. 3,397,993 (Strong). Therein, raw potato strips are blanched by steam or hot water until generally translucent throughout, dehydrated in hot air to cause a weight loss of at least 20 percent, parfried for 30–60 seconds at 375° F. and then frozen to about 0° F. The frozen potato strips are shipped and/or stored until final frying is desired. They are finish fried by immersing in a deep fat or oil bath, usually containing a medium consisting mainly of beef tallow, at a temperature of about 300°–375° F. for 1.5–3.5 minutes.

Another method for preparing french fries for fast food restaurants is taught in U.S. Pat. No. 3,649,305 (Wilder), wherein potato strips are dehydrate to reduce their moisture content by 10–30 percent, blanched, parfried for 30–90 seconds at about 300°–400° F. and then frozen. The frozen strips are then fried in oil for 1.5–3 minutes at 325°–375° F.

Many attempts have been made to duplicate for home use the flavor, aroma, color, texture and total eating experience of deep fat fried french fries prepared according to the above or similar methods. These efforts have met with varied results. The processes used in the prior art are pan-frying in oil or oven baking. To date, all of these prior art methods suffer from one or more deficiencies. For example, they produce limp, soggy, greasy, or dehydrated products which do not approximate the total eating experience of fast-food french fried potatoes. Examples of these prior art methods include those disclosed in U.S. Pat. No. 3,597.227, Reissue No. 27,531 (Murray et al.), U.S. Pat. No. 3,865,964 (Kellermeier et al.), U.S. Pat. No. 3,751,268 (Van Patten et al.), U.S. Pat. No. 4,317,842 (El-Hag et al.), U.S. Pat. No. 4,551,340 (El-Hag et al.), U.S. Pat. No. 4,109,020 (Gorfien et al.), U.S. Pat. Nos. 4,456,624 and 4,559,232 (both to Glantz et al.), U.S. Pat. No. 4,632,838 (Doenges), U.S. Pat. No. 4,590,080 (Pinegar), U.S. Pat. No. 4,219,575 (Saunders et al.) and U.S. Pat. No. 4,272 553 (Bengtsson et al.)

U.S. Pat. No. 4,317,842 (El-Hag et al.), for instance, discloses a process for producing french fried potatoes which upon oven baking is intended to simulate deep for fried potato strips. Raw potatoes are washed, peeled, cut, blanched and otherwise processed in a conventional manner. The potato strips are then coated with a 4 percent potato starch solution and soaked in an oil bath at a temperature of from 120°–210° F. for 2–6 minutes. If the potato strips are conventional frozen potato strips as received by fast food restaurants, they are parfried and frozen prior to coating in the starch solution and oil soaking. The oil-soaked potato strips are then parfried frozen. They are reconstituted by oven baking, preferably using a special conductive heat transferring apparatus.

Another reference, U.S. Pat. No. 3,865,964 (Kellermeier) discloses a process for producing an oven baked french fried product by spraying edible oil or fat onto frozen potato strips, freezing the potato strips, and then baking the potato strips in an oven.

It is an object of the present invention to provide a french fried product which upon reheating to a suitable temperature for consumption closely resembles the flavor, aroma, texture, mouthfeel and total eating experience of a deep-fat fried fast food french fry.

It is yet another object of the present invention to provide a french fried product which when reheated to a suitable serving temperature by conventional or convection oven, or a conventional food warming device such as a heat lamp, closely resembles the flavor, aroma, texture, mouthfeel and total experience of a deep-fat fried fast food french fry.

It is a further object of the present invention to provide a french fried product which may be kept warm for an extended period of time after reheating in a conventional or convection oven without becoming soggy, limp, or suffering structural damage.

It is yet another object of the present invention to provide a french fried potato product which can be reheated in bulk or in the consumer's home in a very short period of time, and which is virtually indistinguishable from deep-fat fried french fried potatoes which may be purchased in fast-food restaurants.

SUMMARY OF THE INVENTION

In accordance with the above-mentioned objectives and others, one embodiment of the present invention relates to a process for preparing improved french fried potatoes suitable for subsequent reheating in a conventional or convection oven to obtain a product having a crisp exterior and a tender interior, comprising parfrying potato strips, cooling the parfried potato strips, finish frying the potato strips to a fully cooked, ready-to-eat condition, and gently freezing the finish fried potato strips without substantial desiccation to minimize structural damage.

Preferably, the finish fried potato strips are frozen in a tunnel cooled by a gentle flow of a freezing agent in the vapor state such as liquid nitrogen in a manner which substantially avoids desiccation and structural damage.

In a preferred embodiment, the parfried potato strips are frozen. The frozen parfried potato strips are thereafter tempered until they attain an internal temperature from about 27° F. to about 33° F. prior to finish frying.

The frozen finish fried potato strips may be reheated to a suitable eating temperature by warming for a short period of time in a conventional or convection oven, or by warming via a conventional food warming device such as a heat lamp. Also, the reheated and ready-to-eat french fries may be kept at eating temperatures via the use of a food warming device for an extended period of time.

The potato strips which are reheated, or are reheated and kept warm in the manner discussed above are a golden brown color and have a crisp exterior and a fluffy, light (tender) interior. The finished potato product has a color, texture, mouthfeel and taste which closely resembles commercially prepared french fried potatoes which have been prepared by deep-fat frying, such as McDonald's TM french fries.

The present invention is also related to a method for treating frozen parfried potato strips in a temperature controlled environment kept from about 28° F. to about 45° F. until the potato strips attain an internal temperature from about 27° F. to about 33° F. Preferably, the method further comprises physically mixing the potato strips to enhance even heat transfer.

The present invention is also related to a method of freezing finish fried potato strips comprising placing the potato strips in a tunnel cooled by a gentle flow of a freezing agent which is much colder than the temperature of the tunnel.

DETAILED DESCRIPTION

Figure 1:
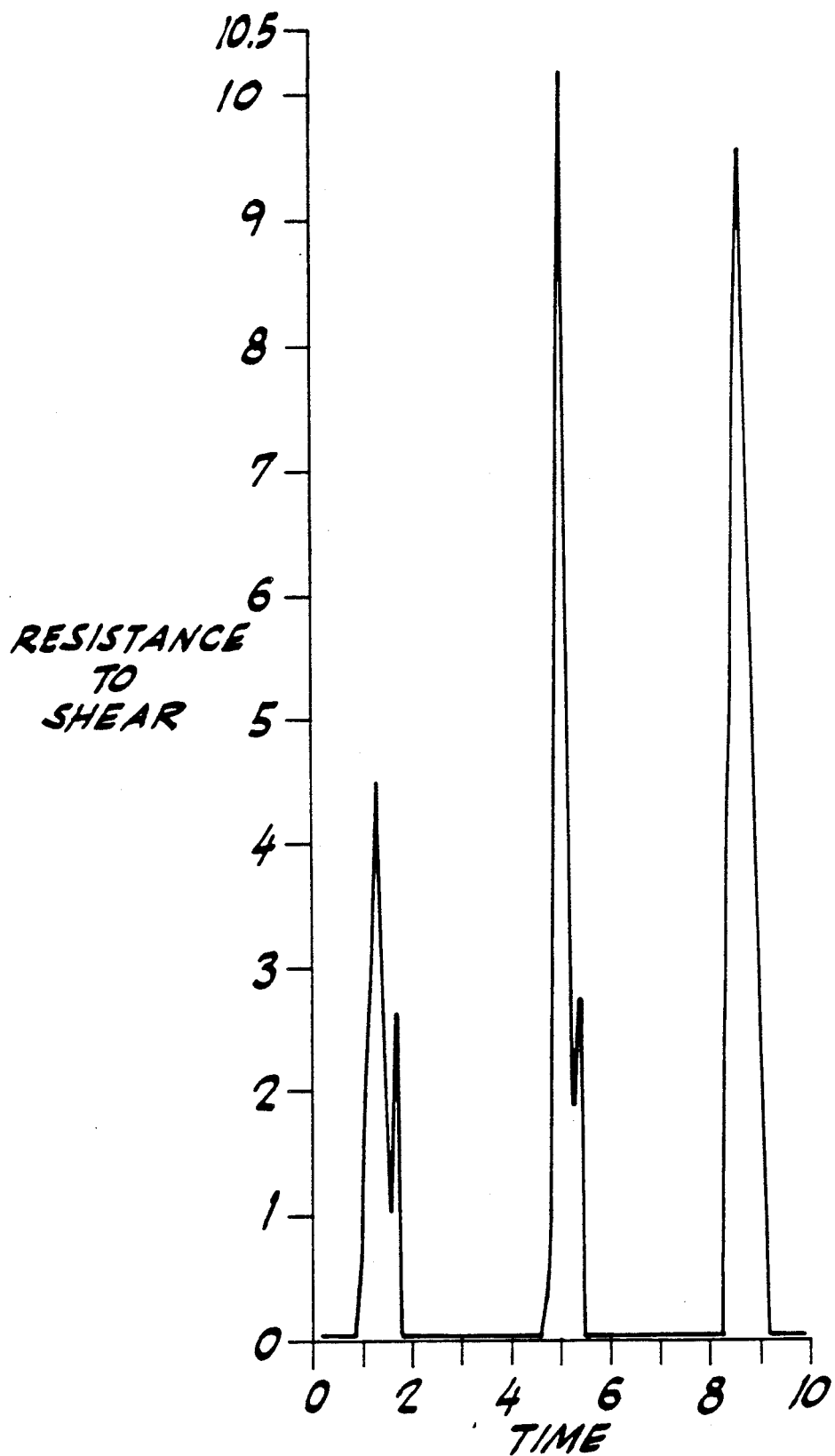

The process of the present invention is practiced upon conventional potato strips first by the initial preparation of whole potatoes into strips which may be treated as discussed below. Basically, the whole potatoes are washed, peeled and then cut into strips having the desired size and shape. Thereafter, the potato strips are blanched. Blanching has a leaching effect on sugars present in the potato strips and serves to even out the sugar levels throughout the potato strips in order to prevent the production of dark or uneven colored finished fries, which is caused mainly by the action of enzymes which are inactivated in the blanching step. Commercial procedures for washing, peeling, cutting and blanching in the production of french fried potatoes are discussed in "Potato Processing" by William F. Talburt and Ora Smith, Fourth Edition, 1987, published by The AVI Publishing Company Inc., Westport, Conn. at pages 491-529. In particular, blanching is usually carried out by exposing the raw cut strips to either water or steam for a suitable time and temperature well known in the prior art.

The potato strips which are used in the present invention may be of varying size and shape. However, it is preferred in one embodiment that the relatively thin and elongated potato strips known in the art as "shoestrings" be used. Shoestring potato strips, as the term is used herein, is defined as potato strips which are from about 3/16 to about 5/16 inch square in cross-section and from about 2.5 to about 5 inches in length. Preferred is a shoestring potato strip of from about ¼ to about 5/16 inch (per side) square in cross-section and from about 2.5 to about 4.5 inches in length.

In another embodiment of the present invention, it is preferred to use irregularly cut potato strips known in the art as "crinkle-cut" strips. Such strips usually average from about 5/16 to about 7/16 inch square in cross-section and from about 2 to about 3 inches in length. Preferred is a crinkle cut potato strip which is about 5/16 inch square in cross-section.

Also, straight cut thick fries of about ½ inch square in cross-section and about 2.5 to about 3.5 inches in length may be used.

An example of a preferred manner of the initial preparation of the potato strips is taught in U.S. Pat. No. 3,397,993 (Strong), assigned to McDonald's System Inc., and hereby incorporated by reference. Strong teaches that after the strips are washed free of starch by barrel washing, fluming, etc., they are then blanched preferably by steam for about 2-10 minutes until all portions of the strips receive enough heat to turn them into a generally translucent condition throughout. Alternatively, a hot water blanch may be used for about 3-8 minutes at a temperature of about 160°-200° F. The strips are then dehydrated by subjecting them to heated air currents to reduce their moisture content for about 5-20 minutes at a temperature of about 150°-350° F. Thereafter, the strips are parfried in a deep fat fryer for a short period of time, preferably from about 15 to about 60 seconds at a temperature of from about 300° F. to about 375° F. The parfrying has the effect of further reducing the moisture content and partially frying the raw potato strips. The term "parfrying" refers to the partial frying of a potato strip to a degree less than that of a fully cooked or "finish fried" potato strip.

In most instances, the oil used to accomplish the parfrying of the potato strips comprises refined beef tallow oleo stock or a blend of beef tallow and a lesser amount of one or more vegetable oils, i.e. usually 10-15 percent.

The strips are then frozen, for instance by placing them directly into a freezer, by first cooling the strips and then freezing them to about 0° F., or by blast freezing them at a temperature of from about −25° F. to about −30° F. by the use of freon, etc. The frozen strips are then packaged as desired, stored and/or shipped for further processing.

Although the Strong disclosure is discussed above as an example of the manner in which the potato strips may be treated, it is not meant to be exclusive. Many other procedures well-known in the art are also suitable, such as that which is disclosed in U.S. Pat. No. 3,649,305 (Wilder), hereby incorporated by reference.

It is also important to note that other fats and oils in addition to or in the place of beef tallow may be used to parfry the potato strips. For instance, hydrogenated cottonseed oil, soybean, palm, safflower, coconut, peanut oils and the like, or combinations thereof can also be used. Additionally, it is envisioned that a calorie-less fat such as Olestra TM, from the Procter and Gamble Co., would also be useful in parfrying and/or finish frying.

The potato strips may be further pretreated prior to freezing according to conventional methods known in the art. For instance, the potato strips may be treated with sodium acid pyrophosphate (SAPP), a chelating agent used to prevent discoloration of the strips. Dextrose (corn sugar) may be used in order to provide a golden color upon frying. Sulfur dioxide may be used to inhibit browning. Other pretreatments known in the art may also be used.

The parfried and frozen potato strips generally have a moisture content of about 60-70 percent, a fat content of from about 4 to about 7 percent by weight, and a potato solids content of from about 23 to about 36 percent by weight of the potato strip.

In another embodiment of the present invention, raw unpeeled white potatoes are obtained for processing. Usually, raw white potatoes have a moisture content of about 75-85 percent by weight. Although any variety of potato would be useful to practice the present invention, Russet Burbank or Katahdin potatoes are preferred. The potatoes are washed, peeled, trimmed, sorted, cut, blanched, and optionally pretreated in any conventional manner or as detailed in the above-mentioned Potato Processing reference. The potato strips are parfried and then preferably cooled. By "cooled" it is meant that the parfried potato strips are brought to an internal temperature from about −20° F. to about 45° F.

If the parfried potato strips are not to be stored in the frozen state for later processing, it is preferred that they are cooled prior to the next processing steps until they have an internal temperature from about 28° F. to about 45° F., and most preferably from about 25° F. to about 32° F.

By a further teaching of the present invention, potato strips are prepared as disclosed in pending applications U.S. Ser. No. 017,140, filed Feb. 20, 1987, now abandoned, and continuation-in-part application U.S. Ser. No. 108,722, filed Oct. 14, 1987, now U.S. Pat. No. 4,959,240, and then treated in accordance with the present invention to render a superior engineered or artificial french fried potato product.

If the parfried potato strips are frozen, it is necessary to temper them prior to finish frying. Tempering is unnecessary if the parfried potato strips have been cooled but not frozen.

The frozen potato strips are tempered until the potato strips have an internal temperature from about 27° F. to about 33° F. This may be accomplished by thawing them for about 8 to about 18 hours in a temperature-controlled chamber kept at about 28° F. to about 45° F., and more preferably from about 32° F. to about 38° F. for about 12 to about 16 hours.

It has been found that the time period necessary to temper the frozen parfried potato strips can be reduced via the physical mixing of the potato strips to maximize even heat transfer. This may be accomplished by tumbling the potato strips during the tempering process, for example, by placing the frozen potato strips on a series of conveyor belts within a temperature-controlled chamber in an arrangement such that the potato strips fall off of one conveyor belt onto another conveyor belt. The physical mixing of the potato strips which are tumbled in this manner maximizes even heat transfer and minimizes processing time.

In a most preferred embodiment, the potato strips are placed on a series of conveyor belts located within an enclosure kept at a temperature from about 28° F. to about 38° F. The layer of potato strips on the conveyor belt is preferably up to about five inches thick. Clean air is circulated through the enclosure at the desired temperature, preferably about 60 to 80 times per hour, and the air velocity within the enclosure is preferably kept to a minimum level. As the layer of potato strips tumble from one conveyor belt to another, a larger percentage of the individual potato strips are directly exposed to the air within the enclosure. As a consequence, the temperature of the individual potato strips increases more rapidly, and the bulk of the potato strips warm at substantially the same rate. Most preferably, the tumbling process continues until the potato strips reach an internal temperature from about 27° F. to about 33° F., and preferably from about 30° F. to about 31° F. Preferably, the tumbling process lasts for about one to about six hours.

Optionally, the parfried potato strips which have been frozen or cooled are dust-coated with potato granules. The dust-coating of the potato strips can be carried out in any conventionally known manner. For instance, the potato strips are placed onto a conveyor belt with vibration action and potato granules are sprinkled onto the potato strips from above. Thereafter, excess potato granules are removed via the vibratory action. The potato granules used for dust-coating should have a fine particle size which produces a coating indistinguishable from the surface appearance of a conventional french fried potato. A thin, even coating of potato granules is thereby accomplished.

The term "potato granules" is defined for purposes of the present invention as comprising any granular product which has been derived from potato products, such as finely ground potatoes, potato flour, dehydrated potato, potato flakes, potato starch, etc., or a mixture of any of the above. All of the above-mentioned granular products are available commercially from any number of sources. One preferred example is a dust powder having 90-95% of its granules at U.S. 40 mesh and which includes no more than 8 percent moisture, available from Basic American Foods Company.

Dust-coated shoestring potato strips according to the present invention will have a layer of potato granules sufficient to cover the potato strips and provide a coherent coating i.e., from about 0.3 to about 5 percent by weight of the potato strip, and more preferably from about 0.6 to about 0.8 percent by weight of the potato strip. Dust-coated crinkle cut potato strips will have a coating which comprises from about 0.3 to about 5 percent, and more preferably about 2.5 percent by weight of the potato strip. A cross-sectional view (perpendicular to the long axis of a shoestring potato strip) shows that the dust-coating blends imperceptively into the potato strip as part of a crisp layer formed during finish frying.

The potato strips are then finish fried. The frying medium is preferably a vegetable shortening or fat, although beef tallow, a blend of beef tallow and one or more vegetable oils, etc. can also be used. In preferred embodiments of the present invention, however, the frying medium is a vegetable fat which mimics the physical properties and mouth-feel of beef tallow. A partially hydrogenated vegetable oil with melting and mouthfeel characteristics which approximate those of beef tallow, and having a Wiley melting point from about 95° F. to about 99° F., a solid fat index at 50° F. from about 34 to about 43, and a solid fat index at 92° F. from about 3 to about 8 is most preferred. An example of a commercially available product having such characteristics is Durkee's Durkex ™ Code #321.

The temperature of the frying medium before the potato strips are added is approximately 370°-375° F. This temperature is depressed (to approximately 340° F.) when the potato strips are added and then rises to about 360° F. during the course of frying. The potato strips are fried in this medium from about 3 to about 5 minutes. Preferably, shoestring potato strips are fried for about 3 to about 4 minutes, while crinkle-cut potato strips are fried for about 4.5 to about 5 minutes. In a continuous process, a temperature of the frying medium of from about 345° F. to about 360° F. would be suitable. The frying temperature and time are inversely proportional and are adjusted to cook the potato strips in a short period of time to provide a product having a crisp exterior and a tender interior. If the parfried potato strips are frozen, it is preferred that the finish frying step occur promptly after tempering and optional dust-coating.

The finish fried potato strips include a reduced water content and an increased fat content, i.e. a moisture content from about 30 to about 50 and a fat content from about 13 to about 22 percent, by weight of the potato strip. The potato solids content of the finish fried potato strips is from about 28 to about 57 percent by weight of the potato strips.

When the potato strips are shoestring potatoes, it is preferred that they are finished fried to a moisture content from about 30 to about 47 percent and a fat content from about 15 to about 20 percent. It is most preferred that the finish fried shoestring potato strips have a moisture content from about 36 to about 38 percent and a fat content from about 17 to about 19 percent. When the potato strips are crinkle-cut potatoes, it is preferred that they are finish fried to a moisture content from about 34 to about 50 and a fat content from about 14 to about 19 percent. It is most preferred that the finish fried crinkle-cut potato strips have a moisture content from about 39 to about 43 percent and a fat content from about 15 to about 18 percent. The density of the finish fried potato strip is from about 0.4 to about 0.65 g/ml.

The finish frying of the potato strips operates to lock in significantly less moisture and more fat than that which is taught in the prior art. The long frying time also operates to generate and lock in more aroma and flavor than otherwise possible.

After finish frying, the potato strips may be seasoned with salt. In one embodiment, finely ground salt is sprinkled onto the surface of the potato strips in an amount sufficient to provide an acceptable taste. An amount of salt from about 0.25 to about 1.0 percent by weight is preferred. Preferably, the potato strips are seasoned with fat-encapsulated salt granules. One example of a preferred fat-encapsulated salt granule is commercially available from Durkee as Durkote Sodium Chloride 150-65 VS, a specially processed salt which has been encapsulated with partially hydrogenated soybean oil. Potato strips which have been seasoned with fat-encapsulated salt and stored frozen for an extended period of time tend to have improved texture and crispness upon reheating in comparison to potato strips seasoned with finely ground salt.

The potato strips are then carefully frozen until the internal temperature of the potato strips is about $-10°$ F. In a preferred embodiment, the finish fried potato strips are promptly frozen. By "promptly frozen", it is meant that the finish fried potato strips are drained of excess oil and allowed to cool to a temperature of from about 100° F. to about 250° F., and preferably from about 1150° F. to about 200° F. before freezing. In most circumstances, the cooling period will be from about 1 to about 5 minutes in order to reach the aforementioned temperatures. Prompt freezing in this manner preserves the flavor and aroma present in the finish fried potato strips, and also preserves the structural integrity of the same. Slow cooling appears to cause a significantly greater percentage of the potato strips to have a collapsed structure upon reheating.

In conventional freezing methods which are utilized in the prior art, cold air from freon coils, etc. is blown directly onto the potato strips by a fan. This method along with other previously used methods, result in significant (e.g. 10%) surface desiccation and dehydration. In contrast, in the present invention, potato strips frozen in the above-described a manner substantially without desiccation and structural damage.

This is accomplished in a preferred embodiment by freezing the potato strips in a tunnel which is cooled by a gentle flow of a freezing agent which is much colder than the tunnel. Liquid nitrogen vapor is especially preferred. More particularly, liquid nitrogen comes out of a tank and into a freezing tunnel. A fan is used to vaporize the liquid nitrogen. The liquid nitrogen vapor thus formed gently flows through the tunnel. No high velocity stream of desiccating wind is utilized. The potato strips pass through the freezing tunnel on a belt and are rapidly frozen as they are contacted by the liquid nitrogen vapor without substantial desiccation.

In one embodiment of the present invention, the liquid nitrogen vapor cools the freezing tunnel to a temperature from about $-30°$ F. to about $-60°$ F. and the freezing process is conducted for about 10 to about 20 minutes until the potato strips attain an internal temperature from about $-10°$ F. to about $-15°$ F.

In an especially preferred embodiment the initial temperature to which the potato strips are exposed in freezing tunnel is at least about $-50°$ F. to about $-60°$ F., the temperature gradually increasing as the potato strips pass through the tunnel until the temperature at the opposite end of the tunnel is about $-10°$ F. to about $-15°$ F. (equal to the desired internal temperature of the potato strips at the end of the freezing process). In this embodiment, the freezing process is conducted for about 10-15 minutes. Preferably, from about 1.5 pounds to about 2.2 pounds of liquid nitrogen are used per pound of the potato strips to accomplish this freezing step. Most preferably about 2 pounds liquid nitrogen are used per pound of the potato strips.

It is important to note that a freezing blast is not directly applied to the potato strips; rather, there is a gentle flow over the potato strips so as not to cause unnecessary dehydration and also so as not to damage the surface.

The freezing of the potato strips in this manner produces a frozen product without any substantial desiccation and without freezer burn, the ice crystals which are formed during the freezing process are as small as possible so as to cause minimal structural damage. If a direct freezing blast is applied, or if the strips are frozen at a lower temperature (colder than approx. $-70°$ F.), a leathery skin develops.

The frozen potato strips are then packed into tightly sealed, i.e. airtight, packages and stored at normal freezer temperatures of approximately 0° F. to about $-20$ F. The containers may contain a large amount of the potato strips, i.e. a few pounds, or may be designed to hold a suitable serving size.

Thereafter, the frozen potato strips may be reheated for consumption simply by warming the potato strips for a short period of time until they attain an internal temperature from about 160° F. to about 180° F.

In one embodiment of the present invention, the potato strips may be removed from the freezer, distributed on any suitable restaurant-style metal sheet pan, and reheated in a conventional or a convection oven. The potato strips are reheated until the product attains an internal temperature of at least about 140° F. The reheating time of course is dependent upon the type of oven used, the temperature setting, and the amount and depth of potato strips to be reheated.

For example, the frozen finish fried potato strips may be reheated in a convection oven set at 350° F. in about 3-5 minutes. Conventional ovens transfer heat less efficiently than convection oven since they depend on conductive and to a lesser extent, radiational heating, both of which are more passive forms of heat transfer than is convective heating. As a result, oven temperature and reheating time must increase in order for the potato strips to reach the same internal temperature. Thus for example, the frozen finish fried potato strips may be reheated in a conventional electric oven set at 450° F. in about 7-10 minutes.

In contrast to prior art oven-prepared french fries, it is not necessary to spread the potato strips of the present invention on the pan in a monolayer. The potato strips of the present invention may be spread on the pan to a depth from about one to about one and one-half inches.

Since the potato strips preferably have been fully cooked during the finish frying, the reheating time is adjusted to reconstitute the strip (substantially only heating as opposed to cooking) to its condition immediately after finish frying.

The reheated potato strips may be eaten immediately upon their removal from the oven. On the other hand, the reheated potato strips may be allowed to cool for about 30 seconds. The product is then on the average from about 130° F. to about 140° F. and ready to serve. The potato strips are crisp on the outside, tender on the inside, golden in color, and closely resemble the flavor, aroma, texture and total eating experience of the McDonald's TM french fry.

The ready-to-eat potato strips may be kept at the desired temperature for consumption (i.e. 130°-140° F.) via the use of a food warming device such as a commercially available heat lamp. The potato strips can be maintained at such temperatures for an extended period of time without becoming soggy, limp or suffering structural damage.

Generally, the reheated french fry will have slightly less moisture and slightly more fat than after finish frying. The composition of the reheated french fries includes a moisture content from about 30 to about 50 percent, a fat content from about 13 to about 22 percent, and a potato solids content from about 28 to about 57 percent by weight of the potato strip. The moisture content of the reheated shoestring french fried product is preferably from about 28 to about 44 percent and a fat content from about 14 to about 23 percent, and most preferably a moisture content from about 36 to about 38 percent and a fat content from about 17 to about 19 percent by weight of the reheated potato strips. The reheated crinkle-cut french fries preferably have a total moisture content from about 35 to about 47 percent and a fat content from about 14 to about 23 percent, and most preferably a moisture content from about 39 to about 43 percent and a fat content from about 15 to about 18 percent. The density of the microwave reheated french fried product is from about 0.3 to about 0.6 g/ml.

In an alternative embodiment of the present invention, the final freezing step (after finish frying) may be omitted if shipping and/or storage is not necessary. In this embodiment, the potato strips are allowed to cool at room temperature or are refrigerated after finish frying and thereafter a serving portion is simply placed in a conventional or convection oven or a food warming apparatus such as a heat lamp, and reheated as detailed above when desired. After reheating, the product has characteristics which were described above.

DETAILED DESCRIPTION OF THE PARTICULAR EMBODIMENTS

The following examples illustrate various aspects of the present invention. They are not intended to limit the claims.

EXAMPLES 1 and 2

Conventional frozen parfried shoestring potato strips made available to fast food restaurants are obtained for subsequent processing. One skilled in the art will appreciate that such conventional frozen potato strips are derived from whole potatoes which have been peeled, cut, possibly treated with one or more of the chemicals discussed previously, and either water or steam blanched. These potato strips are thereafter parfried for approximately 30-60 seconds at about 375° F. and frozen.

One portion of the above-mentioned potato strips representing Example 1 is then further processed. First, the frozen potato strips are allowed to temper at 34° F. in a temperature controlled chamber for 4 hours with physical mixing of the potato strips to maximize even heat transfer and minimize processing time. The tempered strips are then dust-coated with potato granules (U.S. 40 mesh/ground potato). The dust-coating of the potato granules comprises about one percent by weight of the potato strip. The dust-coated potato strips are promptly placed into a deep-fat fryer. The frying medium used is Durkee's TM code #321. The temperature of the frying medium before the potato strips are added is approximately 355° F. to 365° F. This temperature is depressed when the potato strips are added, and increases during the frying time. The temperature range of the frying medium during frying is from about 340° F. to about 370° F. The potato strips are fried for about 3 minutes. Thereafter, the potato strips are removed from the fryer and the oil is allowed to drain from their surface. The potato strips are allowed to cool for about one minute to a temperature of about 170° F. and then are promptly frozen by placing them on a belt which passes through a freezing tunnel which is cooled by an indirect flow of liquid nitrogen vapor. The potato strips are exposed to an initial temperature in the freezing tunnel of about −55° F. The temperature of the freezing tunnel was gradually increased as the potato strips passed through the tunnel until the temperature at the opposite end of the tunnel is about −10° F. The freezing process was conducted for about 13 minutes. The internal temperature of the potato strips after freezing is about −15° F. Example 2 is prepared in an identical manner except that the dust-coating step is omitted.

The frozen potato strips of Example 1 and 2 were separately packed in polyethylene bags of a type commonly used to store frozen foods and stored at freezer temperatures (approximately 0° F. to −10° F.). The composition of potato strips prepared according to Example 2 prior to reheating were subjected to compositional analysis. Compositional analysis was also performed on certain commercially available products designed for conventional oven reconstitution. In comparative Example A, McCain shoestring french fries were analyzed prior to final oven cooking. In comparative Example B, Ore-Ida shoestring french fries were analyzed prior to final oven cooking. The results are provided in Table 1.

TABLE 1

| COMPOSITIONS PRIOR TO REHEATING | | | |
|---|---|---|---|
| Example | % H$_2$O | % Fat | Density (g/ml) |
| 2 | 37.8 | 17.9 | 0.56 |
| A (McCain shoestring) | 54.4 | 8.6 | 0.77 |
| B (Ore-Ida shoestring) | 65.2 | 6.4 | 0.85 |

A 770 gram sample (equivalent to approximately 12 servings) of each Example was removed from the freezer after 24 hours, placed on restaurant-style metal sheet pans (18"L×13"W×1"H) to a depth of between one and one-and-one-half inches, and separately reheated in a convection oven set at 350° F. for 3.5 minutes until the french fries reached a temperature of about 180° F. The heated portions were then allowed to cool for about one minute, at which time they were ready to serve. The french fried potato product of Example 1 had a crisp, golden exterior and a fluffy, light interior, and had an aroma, flavor, mouthfeel and total eating experience closely resembling that attained by the conventional state of the art commercially available deep fat fried fast-food product, i.e. McDonald's TM french fries. Example 2 was virtually identical in all of the aforementioned properties.

After the potato strips of Examples 1 and 2 had been stored for 7 days at freezer temperatures, another 770 gram portion of each was removed from the freezer and separately reheated in a convection oven as detailed above. The french fried potato product of both Example 1 and 2 were virtually identical to that which was prepared after 24 hours of freezing.

The potato strips prepared according to Example 2 were subjected to compositional analysis after convection oven reheating. Comparative Examples A and B were then analyzed after final cooking in the same manner. The results are provided in Table 2.

TABLE 2

| COMPOSITION AFTER REHEATING IN CONVECTION OVEN | | | |
| --- | --- | --- | --- |
| Example | % H$_2$O | % Fat | Density (g/ml) |
| 2 | 35.9 | 19.4 | 0.47 |
| A (McCain shoestring) | 47.9 | 9.9 | 0.68 |
| B (Ore-Ida shoestring) | 59.3 | 6.8 | 0.77 |

Next, the resistance to shear in french fries prepared according to the present invention was determined via the use of an Instron Universal Testing Instrument (Texturometer). This characteristic correlates to sensory qualities such as crispness, chewiness, mealiness, etc. The Texturometer produces a graphical representation of the characteristics of the french fry being tested. The shape, width, and height of a given peak as well as the area under it relate to the specific textural components of a given french fry. For example, an extremely long and narrow peak indicates brittleness. A short, stubby peak indicates a lack of crispness or an increase in mealiness. An extremely wide peak is indicative of chewiness.

The French fries prepared according to Example 2 were reheated and allowed to cool at room temperature to about 145° F.

The textural properties of the french fries were measured in a Instron Model 1011 testing instrument utilizing a 100 pound capacity load transducer with the load range set at 20%. The instrument was operated in the tension testing mode ("pulling apart"). Shear stress was set at 2.3 inches per minute. Fifteen consecutive measurements were taken, including the ends as well as the centers of the french fries. Testing was completed in about 15-20 minutes by which time the french fries had cooled to about 85° F. A series of french fry "fingerprints" were produced by the Texturometer. A representative "fingerprint" is provided in FIG. 1. The left and right peaks represent the texture at approximately the outer one-third of the length of the french fry, while the center peak represents the texture at approximately the midpoint along the length of the french fry.

Figure 2:
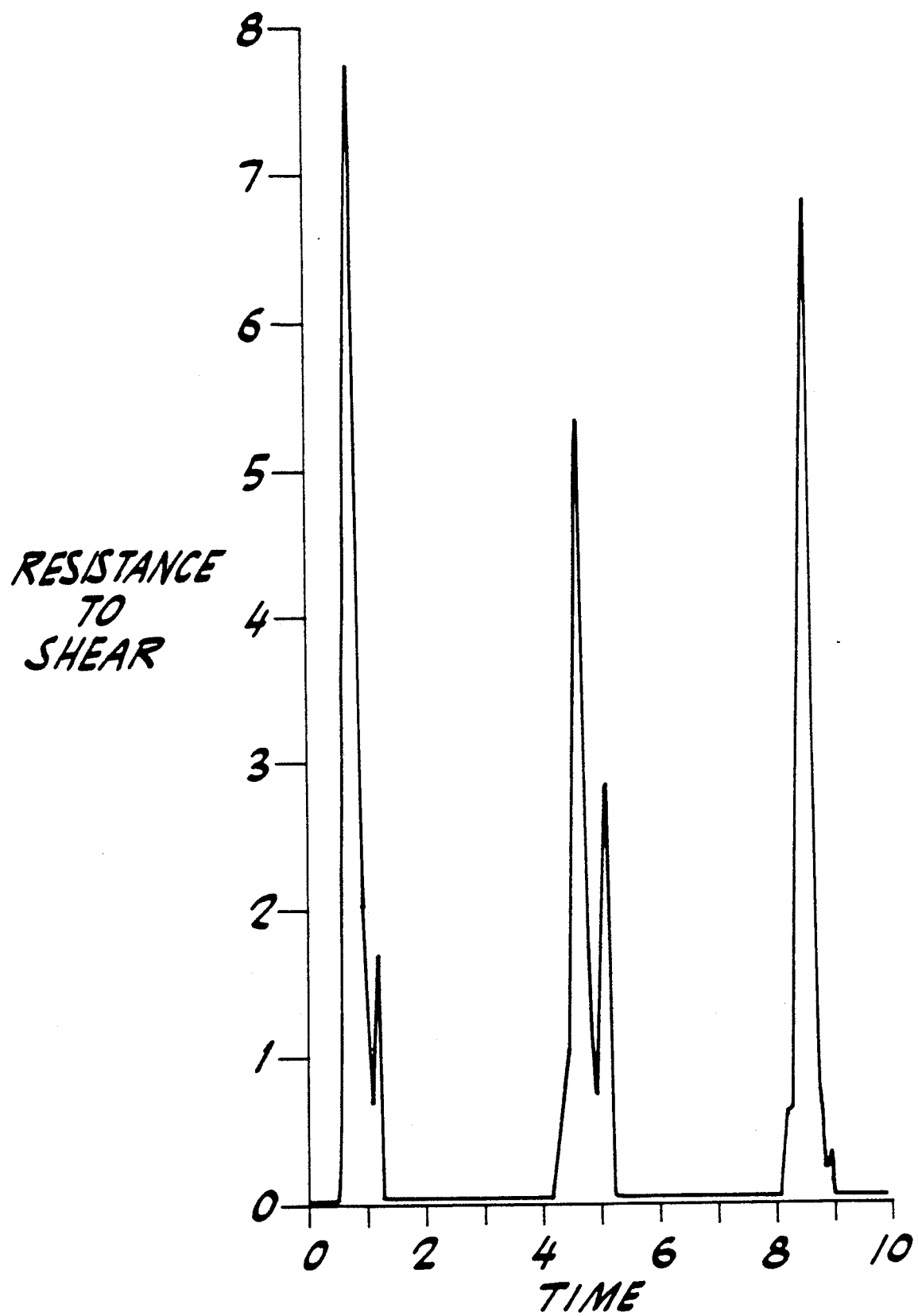

In Comparative Example C, McDonalds french fries were purchased and tested as soon as possible to prevent changes in texture due to cooling. The temperature of the french fries at the start of testing was 145° F. Fifteen consecutive measurements were taken using the texturometer at the settings previously mentioned including the ends as well as the centers of the french fries. Testing took 15 to 20 minutes to complete, by which time the french fries had cooled to approximately 85° F. The results are provided in FIG. 2.

Figure 3:
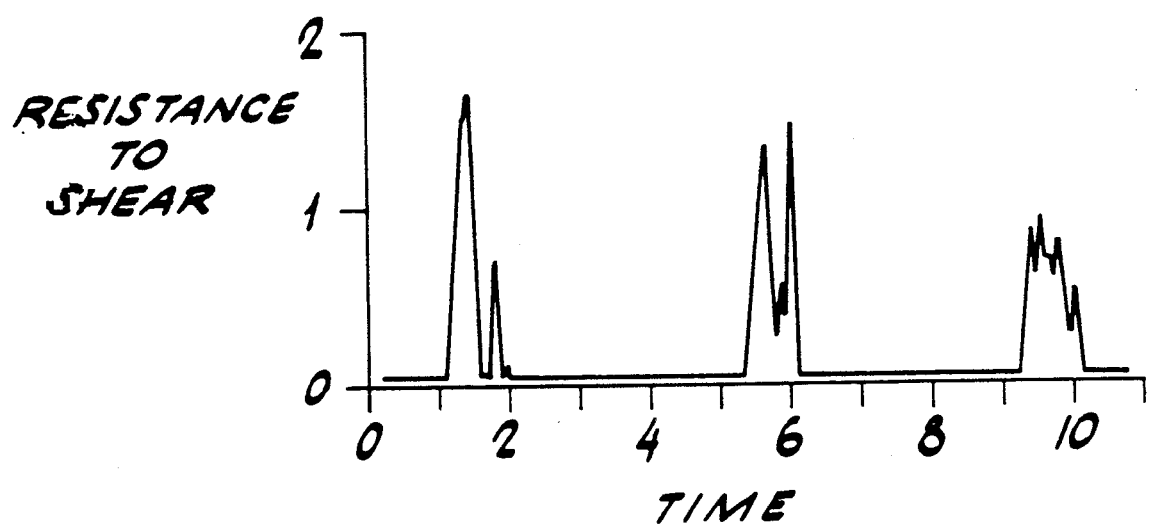

The texture of Comparative Example B was measured after cooking as above and allowing the french fries to cool at room temperature to an internal temperature of about 145° F. using the same texturometer settings set forth for Example 2. The results are provided in FIG. 3.

EXAMPLE 3-4

Example 3 was prepared in an identical manner as Example 1 and Example 4 was prepared in an identical manner as Example 2, except that Examples 3 and 4 were removed from frozen storage and reheated using a conventional oven rather than a convection oven.

In this instance 770 gram samples (equivalent to approximately 12 servings) of Examples 3 and 4 were reheated from the frozen state separately by placing them on restaurant-style metal sheet pans (as described previously) in a conventional electric oven set at 450° F. for 8 minutes, until the french fries reached a temperature of about 180° F.

The heated portions were then allowed to cool for approximately one minute, at which time they were ready to serve. The french fried potato product of Example 3 had a crisp, golden exterior and a fluffy, light interior. The french fried potato product also had an aroma, flavor, mouthfeel and total eating experience closely resembling that attained by the conventional state of the art commercially available deep fat fried fast-food product, i.e. McDonald's TM french fries. Example 4 was virtually identical in all of the aforementioned properties.

After the potato strips of Examples 3 and 4 had been stored for 7 days at freezer temperatures, another 770 gram portion of each was removed from the freezer and separately reheated in a conventional oven as detailed above. The french fried potato product of both Examples 3 and 4 were virtually identical to that which was prepared after 24 hours of freezing.

Figure 4:
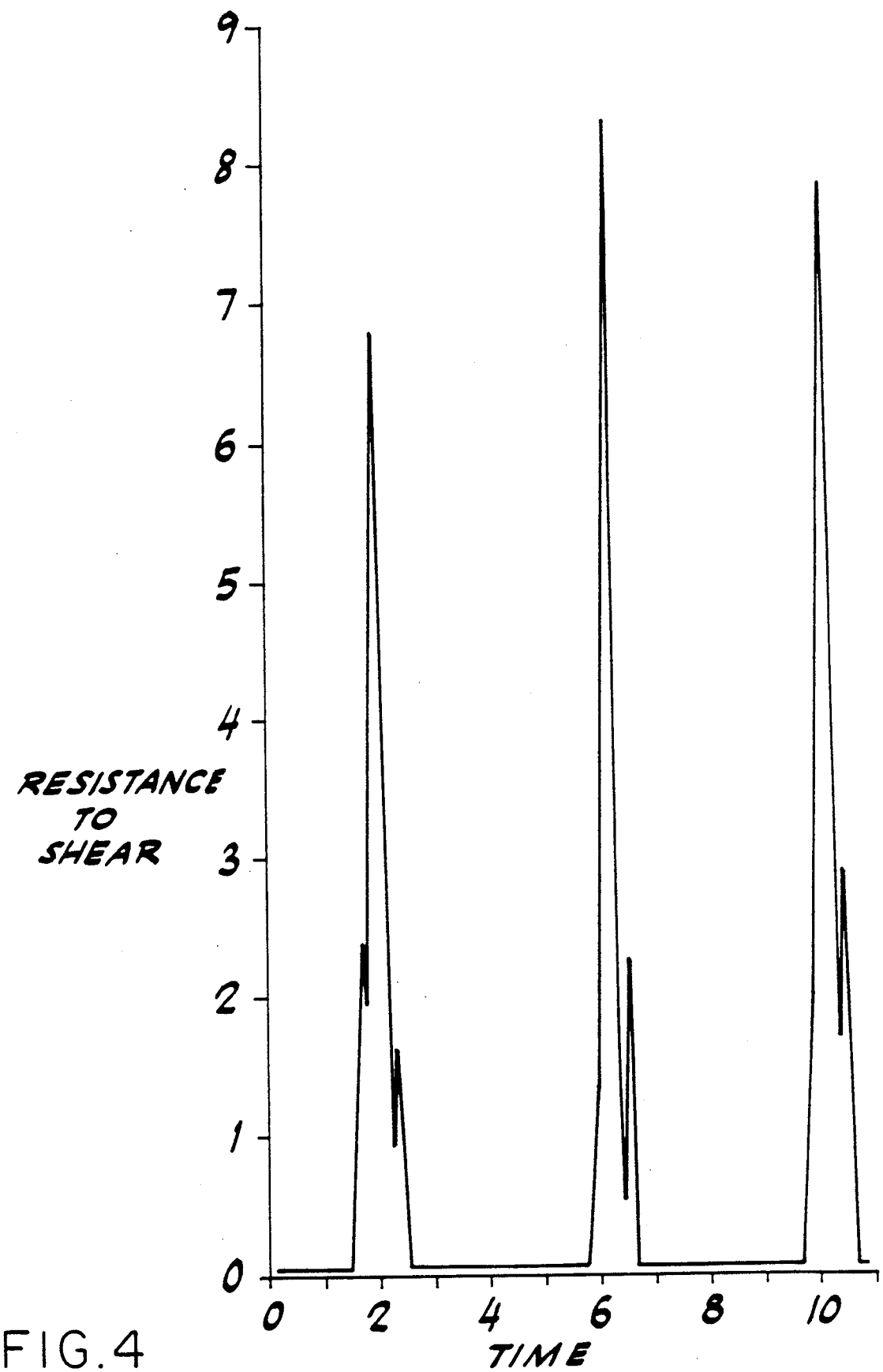

Compositional analysis was performed on potato strips reheated according to Example 4 after conventional oven reheating. Comparative Examples D and E were analyzed after final cooking in a conventional oven in the same manner. The results are provided in Table 3. Texturometer measurements were taken of potato strips prepared according to Example 4 after allowing the reheated potato strips to cool to an internal temperature of about 145° F. The results are provided in FIG. 4.

TABLE 3

| COMPOSITION AFTER REHEATING IN CONVENTIONAL OVEN | | | |
| --- | --- | --- | --- |
| Example | % H$_2$O | % Fat | Density (g/ml) |
| 4 | 33.7 | 19.5 | 0.38 |
| D (McCain shoestring) | 43.9 | 10.0 | 0.50 |

TABLE 3-continued

| COMPOSITION AFTER REHEATING IN CONVENTIONAL OVEN | | | |
|---|---|---|---|
| Example | % H$_2$O | % Fat | Density (g/ml) |
| E (Ore-Ida shoestring) | 54.7 | 7.0 | 0.57 |

EXAMPLES 5-6

French fried potato strips were prepared and frozen according to the method described in Example 2. In Example 5, a monolayer of frozen potato strips (approximately 385 grams or 6 servings) was spread out on a metal sheet pan (18"L×13"W×1"H) and heated in a conventional oven set at 450° for 4 minutes. In Example 6, this procedure was duplicated except that the potato strips were heated for 10 minutes.

The heated portions were then allowed to cool for about one minute, at which time they were ready to serve. The french fried potato product of Example 5 had a crisp, golden exterior and a fluffy, light interior. The french fried potato product also had an aroma, flavor, mouthfeel and total eating experience closely resembling that attained by the conventional state of the art commercially available deep fat fried fast-food product, i.e. McDonald's TM french fries. The french fried potato product of Example 6 was similar to Example 5, except for being slightly darker and having a slightly drier and crisper mouthfeel. Overall, however, Example 6 represented a vast improvement over the prior art ovenable french fry.

The reheated potato strips prepared according to Examples 5 and 6 were subjected to compositional analysis. Comparative Examples F and G were analyzed after final cooking in the same manner. The results are provided in Tables 4 and 5 respectively.

TABLE 4

| COMPOSITION AFTER REHEATING IN MONOLAYER, 4 MINUTES | | | |
|---|---|---|---|
| Example | % H$_2$O | % Fat | Density (g/ml) |
| 5 | 36.0 | 18.5 | 0.51 |
| F (McCain shoestring) | 50.0 | 9.9 | 0.70 |
| G (Ore-Ida shoestring) | 61.7 | 6.2 | 0.82 |

TABLE 5

| COMPOSITION AFTER REHEATING IN MONOLAYER, 10 MINUTES | | | |
|---|---|---|---|
| Example | % H$_2$O | % Fat | Density (g/ml) |
| 6 | 31.7 | 20.6 | 0.36 |
| F (McCain shoestring) | 41.9 | 10.2 | 0.47 |
| G (Ore-Ida shoestring) | 52.9 | 7.5 | 0.53 |

Figure 5:
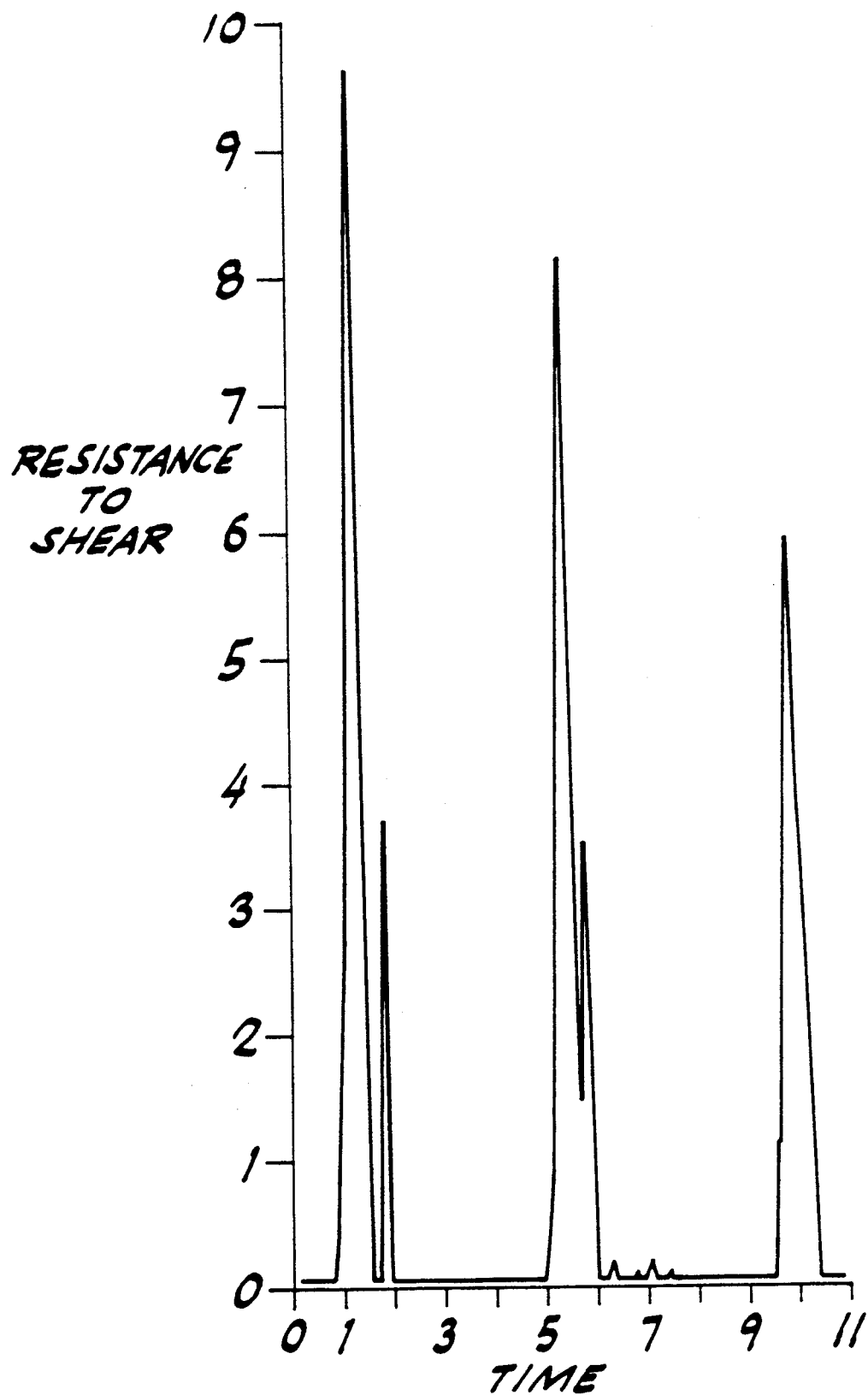
Figure 6:
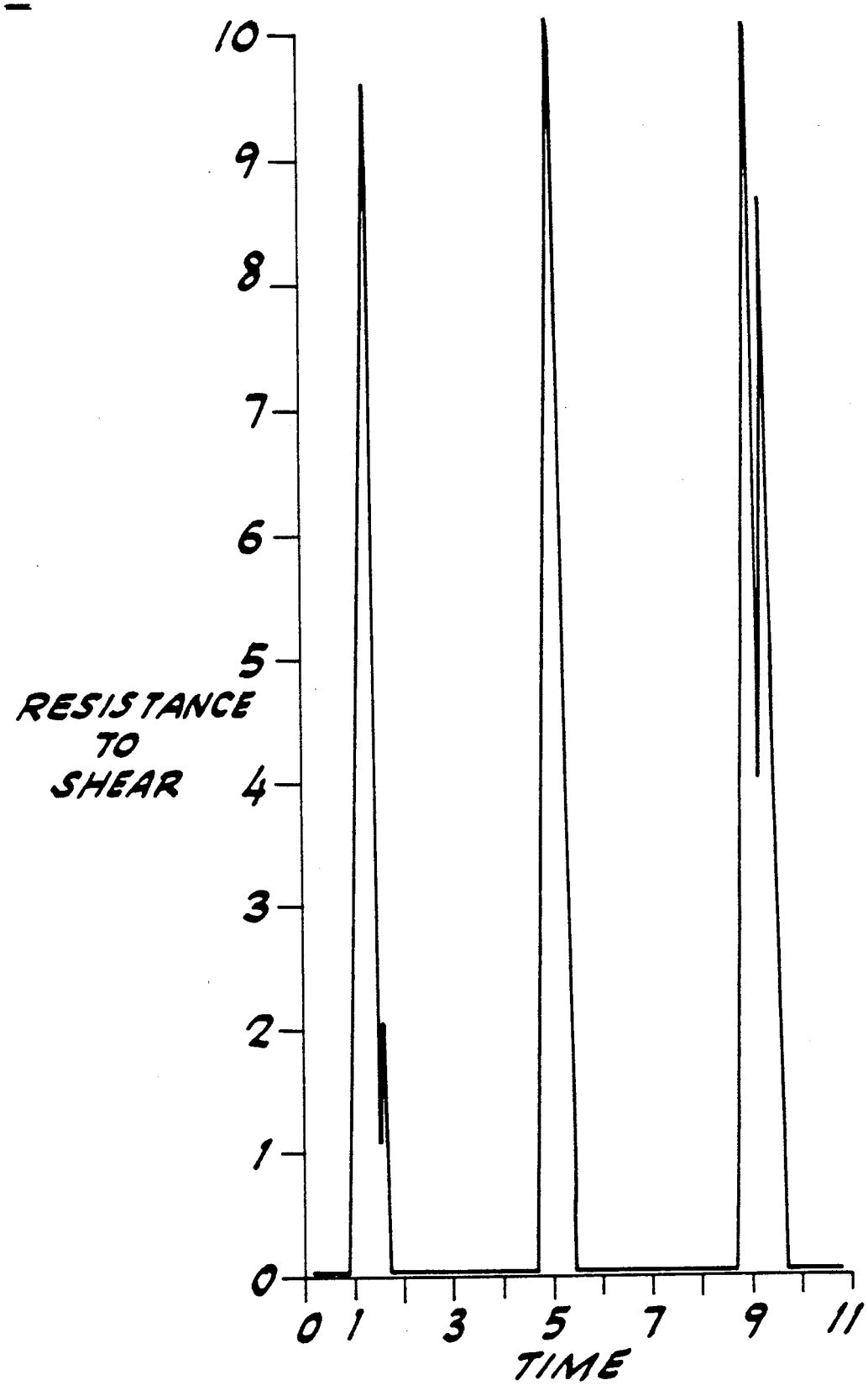
Figure 7:
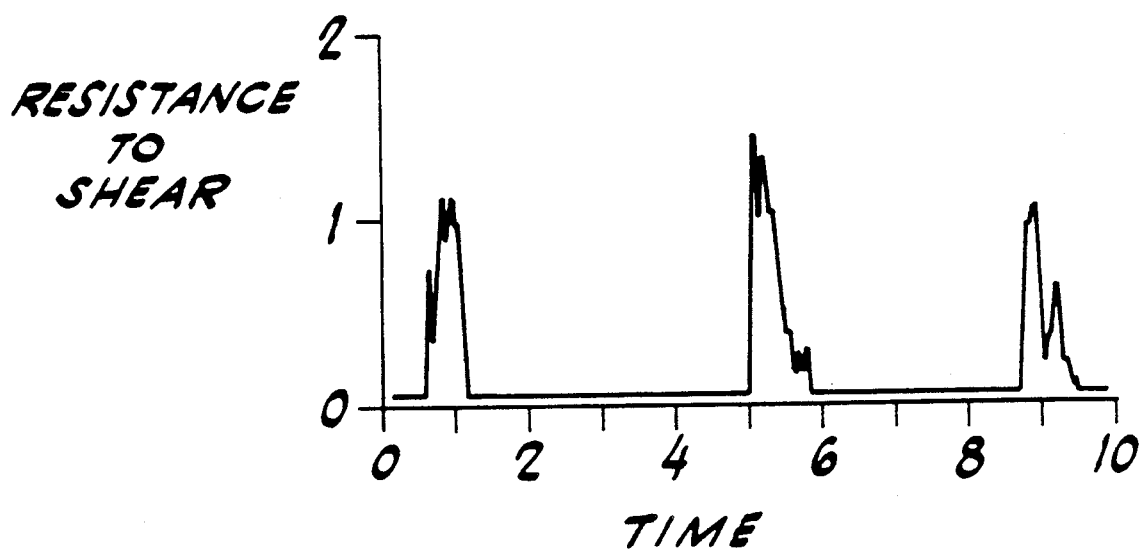

Texturometer measurements were taken of Examples 5 and 6 after cooling to about 145° F. The results are provided in FIGS. 5 and 6, respectively. Texturometer measurements were also taken for Example G after cooking in a monolayer for about 10 minutes and cooling to about 145° F. The results are provided in FIG. 7.

EXAMPLES 7-8

Example 7 was prepared in an identical manner as Example 2 except that the potato strips were seasoned with an application of very fine salt granules after frying and immediately before freezing in the nitrogen tunnel. Salt application was approximately 0.25%-0.75% by weight of the potato strips.

Example 8 was prepared in an identical manner except that the very fine salt granules were replaced by fat-encapsulated salt granules (Durkote Sodium Chloride 150-65 VS). In this case, the rate of application was approximately 0.5%-1.0% by weight of the potato strips.

The frozen potato strips of Examples 7 and 8 were separately packed in polyethylene bags of a type commonly used to store frozen foods and stored at freezer temperatures (approximately 0° F. to −20° F.).

A 770 gram sample (equivalent to approximately 12 servings) of each Example was removed from the freezer after 24 hours, placed on restaurant-style metal sheet pans (18"L×13"W×1"H) to a depth of between one and one-and-a-half inches, and separately reheated in a convection oven set at 350° F. for between 3 and 5 minutes until the french fries reached a temperature of between 160° and 180° F.

The heated portions were then allowed to cool for approximately one minute, at which time they were ready to serve. The french fried potato product of Example 7 had a crisp, golden exterior and a fluffy, light interior. The french fried potato product also had an aroma, flavor (including a pleasant saltiness), mouthfeel and total eating experience closely resembling that attained by the conventional state of the art commercially available deep fat fried fast-food product, i.e. McDonald's TM french fries. Example 8 was virtually identical in all of the aforementioned properties. Both Examples 7 and 8 had improved taste over the unsalted version in Example 2.

After the potato strips of Examples 7 and 8 had been stored for 7 days at freezer temperatures, another 770 gram portion was removed from the freezer and reheated in a convection oven as detailed previously. While the french fried potato strips of both examples were similar to that which had been prepared after 24 hours of frozen storage, the texture of Example 7 was perceptively less crisp than that produced by Example 8. Overall however, both examples represented a vast improvement over prior art ovenable french fries.

EXAMPLES 9-10

In Example 9, potato strips prepared and reheated in a convection oven according to the process described in Example 2 were then held under a heat lamp-type warmer (Merco Model EZ-FW-24 Food Warmer) with a 680 watt infra-red heating tube for 60 minutes. The french fries were then subjected to compositional analysis. Comparative Examples H and I were analyzed after final preparation and warming under the heat lamp in the same manner. The results are provided in Table 6.

TABLE 6

| COMPOSITION AFTER CONVECTION OVEN HEATING FOLLOWED BY HOLDING UNDER HEAT LAMP | | | |
|---|---|---|---|
| Example | % H$_2$O | % Fat | Density (g/ml) |
| 9 | 31.0 | 20.0 | 0.35 |
| H (McCain shoestring) | 49.0 | 10.0 | 0.61 |
| I (Ore-Ida shoestring) | 58.6 | 6.5 | 0.74 |

In Example 10, french fries prepared and reheated in a conventional oven as described in Example 4 were held under a heat lamp for 60 minutes and thereafter subjected to compositional analysis. Comparative Examples J and K were analyzed after final oven cooking in the same manner. The results are provided in Table 7.

TABLE 7

COMPOSITION AFTER CONVENTIONAL OVEN HEATING FOLLOWED BY HOLDING UNDER HEAT LAMP

| Example | % H$_2$O | % Fat | Density (g/ml) |
|---|---|---|---|
| 10 | 31.4 | 18.0 | 0.36 |
| J (McCain shoestring) | 46.4 | 8.4 | 0.56 |
| K (Ore-Ida shoestring) | 56.0 | 8.1 | 0.74 |

EXAMPLE 11-12

Figure 8:
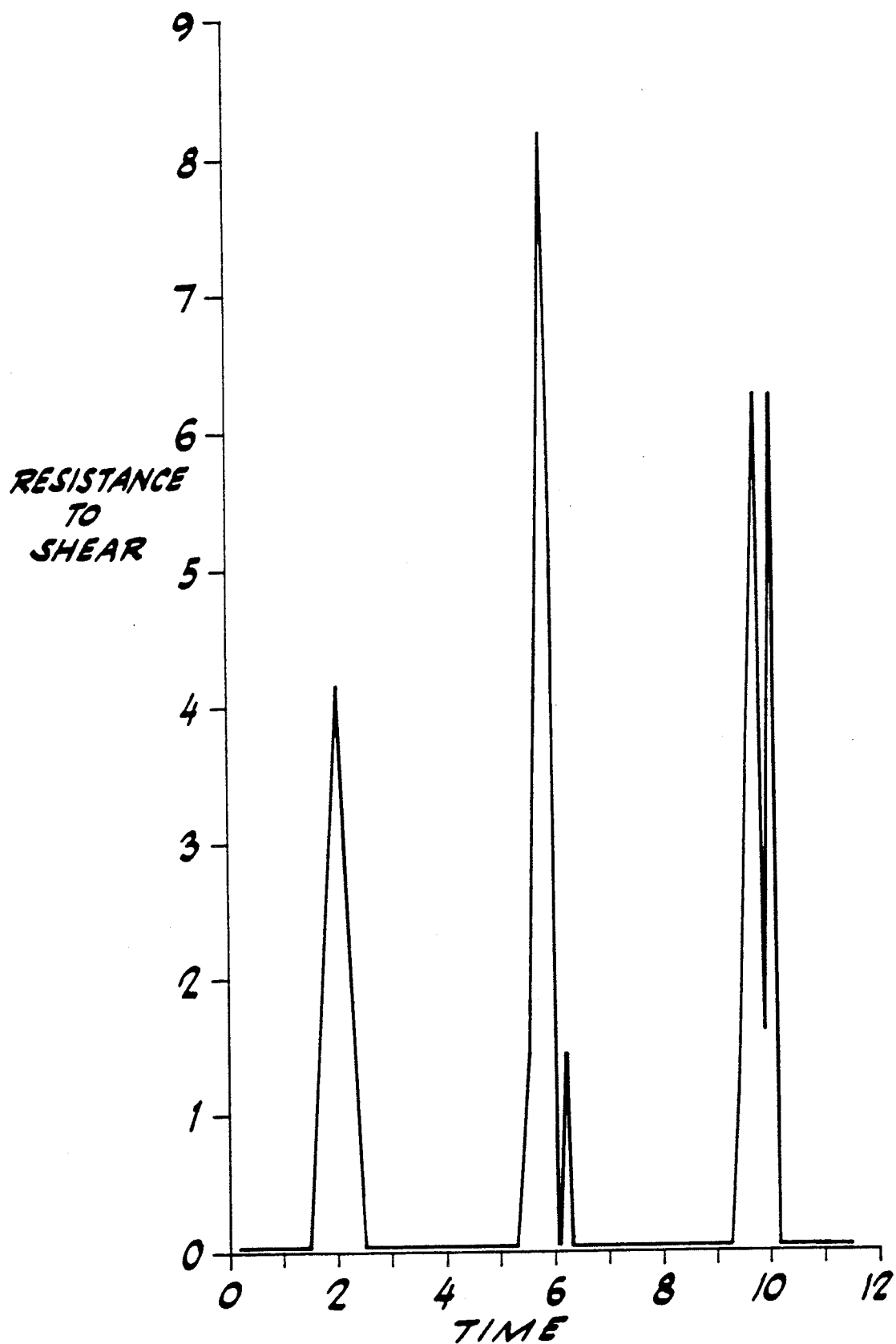

In Example 11, french fries which had been prepared according to the method described in Example 2 were reheated using the aforementioned food warmer as the sole source of heat. In this case, the food warmer was enclosed with a metal foil sheath to improve heating efficiency, and was enclosure was allowed to pre-heat to a temperature of about 195° F. A monolayer of frozen french fried potato strips (approximately 385 grams or 6 servings) spread out on a metal 18"L×13"W×1½"H sheet pan was then introduced into the enclosure and was allowed to heat for 10-12 minutes to a temperature of 145°-160° F. The french fries were then subjected to compositional analysis. Comparative Examples L and M were subjected to compositional analysis after being heated in the same manner. The results are provided in Table 8. The results of texturometer measurements conducted on Example 11 are provided in FIG. 8.

TABLE 8

COMPOSITION AFTER RECONSTITUTION BY HEAT LAMP

| Example | % H$_2$O | % Fat | Density (g/ml) |
|---|---|---|---|
| 11 | 36.0 | 18.3 | 0.49 |
| L (McCain shoestring) | 50.7 | 10.3 | 0.68 |
| M (Ore-Ida shoestring) | 61.0 | 6.7 | 0.78 |

In Example 12, french fries of Example 10 which has been heated using the aforementioned enclosed food warmer were further maintained under the heat lamp with the enclosure removed for 60 minutes. This procedure was repeated for comparative Examples L and M. Compositional analysis are provided in Table 9.

TABLE 9

COMPOSITION AFTER RECONSTITUTION BY HEAT LAMP FOLLOWED BY HOLDING UNDER HEAT

| Example | % H$_2$O | % Fat | Density (g/ml) |
|---|---|---|---|
| 12 | 30.5 | 20.3 | 0.35 |
| L (McCain shoestring) | 49.7 | 10.5 | 0.62 |
| M (Ore-Ida shoestring) | 57.0 | 7.2 | 0.72 |

The french fried potato product of Example 10 had a crisp, golden exterior and a fluffy, light interior. The french fried potato product also had an aroma, flavor, mouthfeel, and total eating experience closely resembling that attained by the conventional state of the art commercially available deep fat fried fast-food product, i.e. McDonald's ™ french fries.

Examples 9, 10 and 12 were virtually identical to the french fried potato product of Example 11, except for having a somewhat drier and crisper texture. Overall, however, these examples represented a vast improvement over the prior art ovenable french fry.

EXAMPLE 13

Conventional crinkle-cut frozen parfried potatoes made available for food service usage were obtained for further processing. One skilled in the art will appreciate that such conventional frozen crinkle-cut potatoes are derived from whole potatoes which have been peeled, cut, possibly treated with one or more of the chemicals discussed previously, and either water or steam blanched. These potatoes are thereafter parfried for approximately 30-60 seconds at about 375° F. and frozen.

The crinkle-cut potato strips were tempered and in a temperature controlled chamber at 34° F. for 4 hours with physical mixing. Thereafter, the crinkle-cut potato strips were finish fried. The crinkle-cut potatoes required longer residence time of six minutes in the deep fryer for finish frying due to the increased thickness of the individual potato pieces. Thereafter, the potato pieces are removed from the fryer and the oil is allowed to drain from their surface. The potato pieces are allowed to cool for 3 minutes to an internal temperature of approximately 170° F. and then are promptly frozen by placing them on a belt which passes through a tunnel cooled by an indirect flow of liquid nitrogen until the potato strips attained an internal temperature of approximately −15° F.

The frozen finish fried crinkle-cuts were packed in polyethylene bags of a type commonly used to store frozen foods and stored at freezer temperatures (approximately −15° F.).

A 770 gram sample was removed from the freezer after 24 hours, placed on restaurant-style metal sheet pans (18"L×13"W×1"H) to a depth of approximately one inch and reheated in a convection oven set at 350° F. for 3 minutes, until the french fries reached a temperature of approximately 180° F.

The heated portions were then allowed to cool for 2 minutes at which time they were ready to serve. The french fried potato product of Example 13 had a crisp, golden exterior and a fluffy, light interior. The french fried potato product also had an aroma, flavor, mouthfeel, and total eating experience closely resembling that attained by the conventional state of the art commercially available deep fat fried crinkle-cut potatoes.

A portion of the french fried crinkle-cut potatoes prepared according to the method described in Example 13 was then subjected to compositional analysis both before and after reheating in the convection oven as previously described. This was compared to analytical data determined from Comparative Examples N and O, commercially available products which are intended primarily for oven reconstitution. Results are provided in Table 10.

Figure 9:
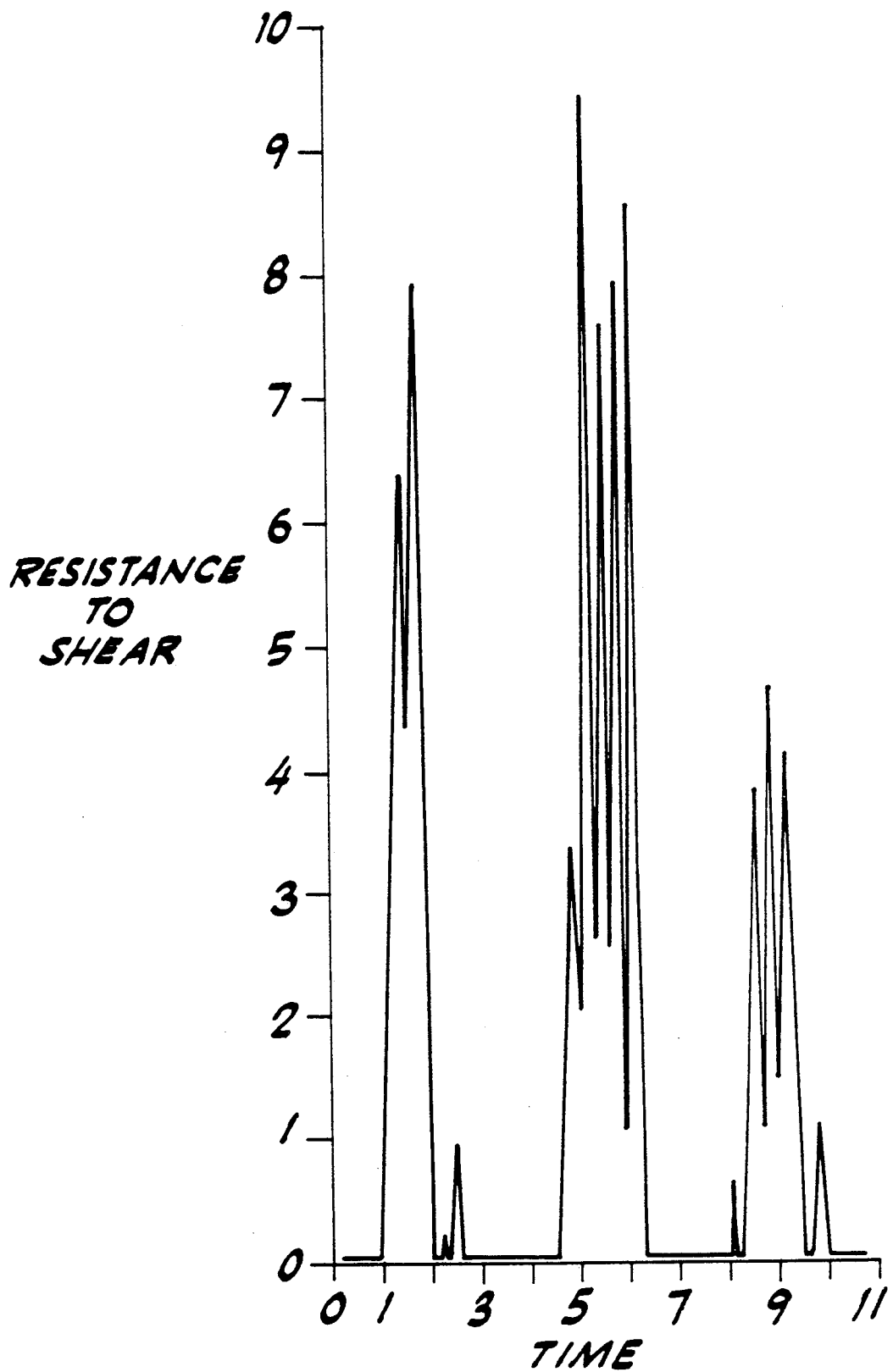
Figure 10:
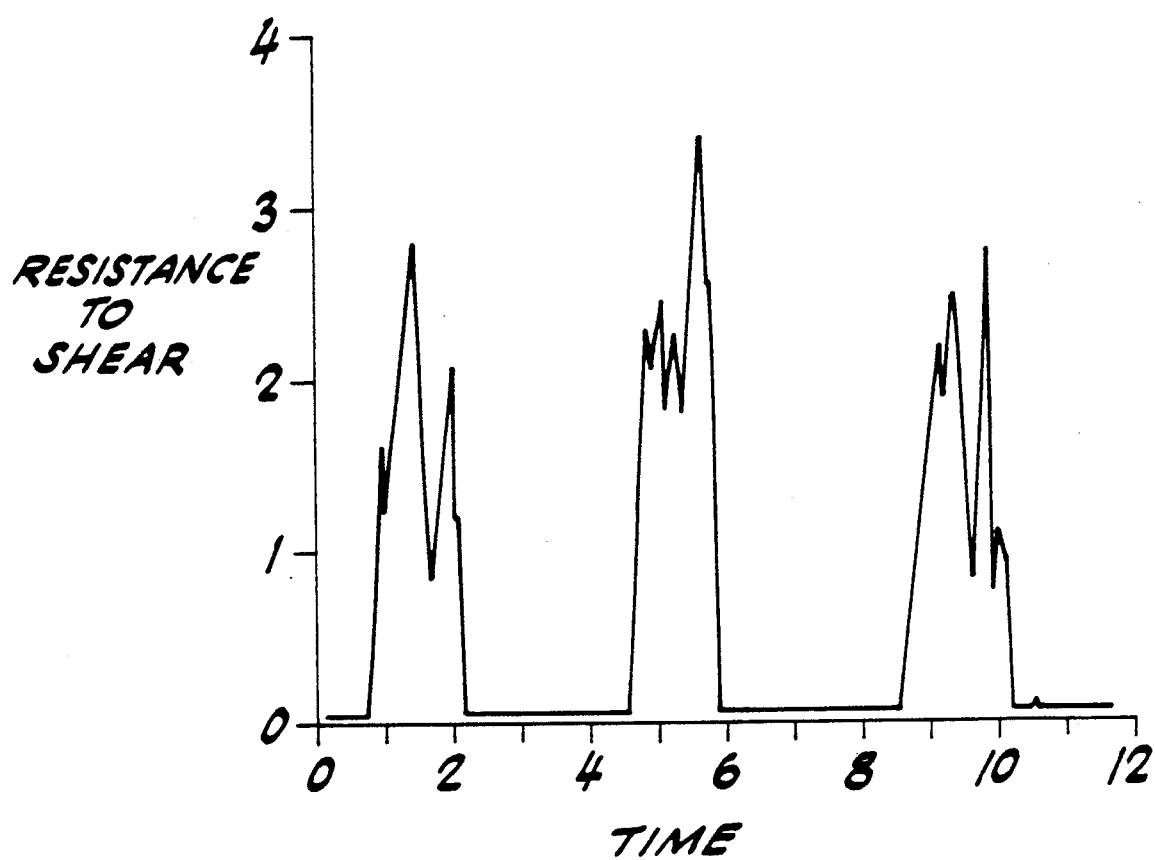

Next, texturometer measurements were taken of the reheated crinkle-cut potato strips of Example 13 after allowing them to cool to an internal temperature of about 145° F. The results are provided in FIG. 9. Texturometer measurements of Comparative Example O are provided in FIG. 10.

TABLE 10

COMPOSITION BEFORE AND AFTER REHEATING IN CONVECTION OVEN

| | BEFORE | | | AFTER | | |
|---|---|---|---|---|---|---|
| Example | % H$_2$O | % Fat | Density (g/ml) | % H$_2$O | % Fat | Density (g/ml) |
| 13 | 41.3 | 16.2 | 0.58 | 37.3 | 17.9 | 0.53 |

TABLE 10-continued

COMPOSITION BEFORE AND AFTER REHEATING IN CONVECTION OVEN

| Example | BEFORE | | | AFTER | | |
|---|---|---|---|---|---|---|
| | % H$_2$O | % Fat | Density (g/ml) | % H$_2$O | % Fat | Density (g/ml) |
| N (McCain Ovenable Crinkle Cuts) | 63.3 | 5.7 | 0.86 | 61.0 | 6.0 | 0.83 |
| O (Ore-Ida Ovenable Crinkle Cuts) | 68.1 | 4.1 | 0.89 | 67.2 | 4.8 | 0.87 |

The examples provided above are not meant to be exclusive. Many other variations of the present invention would be obvious to those skilled in the art, and are contemplated to be within the scope of the appended claims.

We claim:

1. A process for preparing fully cooked french fried potatoes which have a crisp exterior and a tender interior upon subsequent reheating in a convection or conventional oven, under a heat lamp, or any combination thereof, comprising
    blanching potato strips,
    parfrying said blanched potato strips,
    cooling said parfried potato strips,
    dust-coating said cooled potato strips with potato granules to provide a thin coherent coating of said potato granules on said potato strips,
    finish frying said dust-coated potato strips to a fully cooked ready-to-eat condition, and
    gently freezing said finish fried potato strips without substantial desiccation so as to minimize structural damage of said potato strips.

2. The process according to claim 1, wherein said finish fried potato strips are frozen in a tunnel cooled to a temperature from about −30° F. to about −60° F. by a gentle flow of a freezing agent for about 10 to about 20 minutes.

3. The process according to claim 1, wherein said finish fried potato strips are frozen in a tunnel cooled by a gentle flow of a freezing agent, said finish fried potato strips passing through a first end of said tunnel cooled to a temperature from about −50° F. to about −60° F. to an opposite end of said tunnel cooled to a temperature from about −10° F. to about −15° F., the freezing process being conducted for about 10 to about 15 minutes.

4. The process according to claims 2 or 3, wherein said freezing agent is liquid nitrogen vapor.

5. The process according to claims 2 or 3, wherein from about 1.5 to about 2.2 pounds of freezing agent per pound of potato strips is used to freeze said potato strips.

6. The process according to claims 2 or 3, wherein said freezing agent is liquid nitrogen vapor and about 2 pounds of said freezing agent per pound of potato strips is used to freeze said potato strips.

7. The process according to claims 1 or 3, wherein said parfried potato strips are frozen prior to dust-coating.

8. The process according to claim 7, further comprising tempering said frozen parfried potato strips prior to dust-coating in a temperature controlled environment kept from about 28° F. to about 45° F. until said potato strips have an internal temperature from about 27° F. to about 33° F.

9. The process according to claim 8 wherein said tempering further comprises physically mixing said potato strips to enhance even heat transfer.

10. The process according to claims 8, wherein said potato strips are tempered until they have an internal temperature from about 30° F. to about 31° F.

11. The process according to claims 2 or 3, further comprising cooling said finish fried potato strips until said potato strips have an internal temperature of at least about 100° F. to about 250° F. before freezing.

12. The process according to claims 1, 2 or 3 further comprising reheating said frozen finish fried potato strips until said potato strips have an internal temperature of at least about 140° F.

13. The process according to claim 12, wherein said frozen finish fried potato strips are reheated in a conventional oven at about 450° F. for about 7 to about 10 minutes.

14. The process according to claim 12, wherein said frozen finish fried potato strips are reheated in a convection oven at about 350° F. for about 3 to about 5 minutes.

15. The process according to claim 12, wherein said frozen finish fried potato strips are reheated under a heat lamp.

16. The process according to claim 12, wherein said reheated potato strips are shoestring potatoes and have a moisture content from about 28 to about 44 percent and a fat content from about 14 to about 23 percent, by weight.

17. The process according to claim 12, wherein said reheated potato strips are shoestring potatoes and have a moisture content from about 33 to about 36 percent and a fat content from about 19 to about 20 percent, by weight.

18. The process according to claims 12, wherein said reheated potato strips are crinkle-cut potatoes and have a moisture content from about 35 to about 47 percent and a fat content from about 14 to about 19 percent, by weight.

19. The process according to claim 12, wherein said reheated potato strips are crinkle-cut potatoes and have a moisture content from about 39 to about 43 percent and a fat content from about 15 to about 18 percent, by weight.

20. The process according to claim 12, wherein said reheated potato strips have a density from about 0.3 to about 0.6 g/ml.

21. The process according to claim 20, wherein said finish frying is conducted for about 3 to 5 minutes in oil at a temperature from about 355° F. to about 370° F.

22. The process according to claim 12 further comprising maintaining said reheated potato strips at a temperature suitable for consumption via use of a heat lamp.

23. The process according to claim 1, wherein said parfried potato strips are cooled to a temperature from about 28° F. to about 45° F.

24. The process according to claim 1, wherein said finish fried potato strips have a moisture content before reheating from about 30 to about 50 percent and a fat content from about 13 to about 22 percent, by weight.

25. The process according to claim 1, wherein said finish fried potato strips are shoestring potatoes having a moisture content before reheating from about 30 to about 47 percent, and a fat content from about 15 to about 20 percent by weight.

26. The process according to claim 1, wherein said finish fried potato strips are shoestring potatoes having a moisture content before reheating from about 36 to about 38 percent and a fat content from about 17 to about 19 percent, by weight.

27. The process according to claim 1, wherein said finish fried potato strips are crinkle-cut potatoes having a moisture content before reheating from about 34 to about 50 percent, and a fat content from about 14 to about 19 percent, by weight.

28. The process according to claim 1, wherein said finish fried potato strips having a density from about 0.4 g/ml to about 0.65 g/ml.

29. The process according to claim 1, wherein said parfrying is conducted at about 375° F. for about 30 to about 60 minutes.

30. A process for preparing fully cooked french fried potatoes which have a crisp exterior and tender interior, upon subsequent reheating in a convection or conventional oven, under a heat lamp, or any combination thereof, comprising
blanching potato strips,
parfrying said blanched potato strips,
freezing said parfried potato strips,
tempering said frozen parfried potato strips,
dust-coating said tempered potato strips with potato granules to provide a thin coherent coating of said potato granules on said potato strips,
finish frying said dust-coated potato strips to a fully cooked, ready-to-eat condition with said potato strips having a moisture content from about 30 to about 50 percent and a fat content from about 13 to about 22 percent by weight, and
freezing said finish fried potato strips in a tunnel cooled to a temperature from about −20° F. to about −60° F. by a freezing agent which is much colder than the temperature of said tunnel for about 10 to about 20 minutes.

31. The process according to claim 30, further comprising reheating said frozen finish fried potato strips until the internal temperature of said potato strips is at least about 140° F.

32. The process according to claim 30, further comprising tempering said frozen parfried potato strips in a temperature controlled environment kept from about 28° F. to about 45° F. until said potato strips have an internal temperature from about 27° F. to about 33° F.

33. The process according to claim 32, wherein said tempering further comprises physically mixing said potato strips to enhance even heat transfer.

34. The process according to claim 30, wherein said freezing agent is liquid nitrogen vapor.

35. The process according to claim 30, wherein said finish fried potato strips are frozen in a tunnel cooled by a gentle flow of freezing agent, said finish fried potato strips passing through a first end of said tunnel cooled to a temperature from about −50° F. to about −60° F. to an opposite end of said tunnel cooled to a temperature from about −10° F. to about −15° F., the freezing process being conducted for about 10 to about 15 minutes.

36. The process according to claim 35, wherein said freezing agent is liquid nitrogen vapor.

37. A process for preparing fully cooked french fried potatoes which have a crisp exterior and tender interior upon subsequent reheating in a convection or conventional oven, under a heat lamp, or any combination thereof, comprising
blanching potato strips,
parfrying said blanched potato strips without prior oil soaking,
cooling said parfried potato strips to an internal temperature from about −20° F. to about 45° F.,
dust-coating said cooled parfried potato strips with potato granules to provide a thin coherent coating of said potato granules on said potato strips,
finish frying said dust-coated potato strips to a fully cooked, ready-to-eat condition with said potato strips having a moisture content from about 30 to about 50 percent by weight, and
gently freezing said finish fried potato strips without substantial desiccation so as to minimize structural damage of said potato strips.

38. The process according to claim 37, wherein said potato strips are frozen after parfrying.

39. The process according to claim 38, further comprising tempering said frozen parfried potato strips in a temperature controlled environment kept from about 28° F. to about 45° F. until said potato strips have an internal temperature from about 27° F. to about 33° F.

40. The process according to claim 39, wherein said finish fried potato strips are frozen in a tunnel cooled to a temperature from about −30° F. to about −60° F. by a gentle flow of liquid nitrogen vapor for about 10 to about 20 minutes.

41. The process according to claim 37, further comprising reheating said frozen finish fried potato strips until said potato strips have an internal temperature of at least about 140° F.

* * * * *